March 30, 1926.
D. C. DAUBMEYER
1,578,717
ERROR INDICATOR FOR TABULATION CARDS
Filed Sept. 25, 1922
4 Sheets-Sheet 1
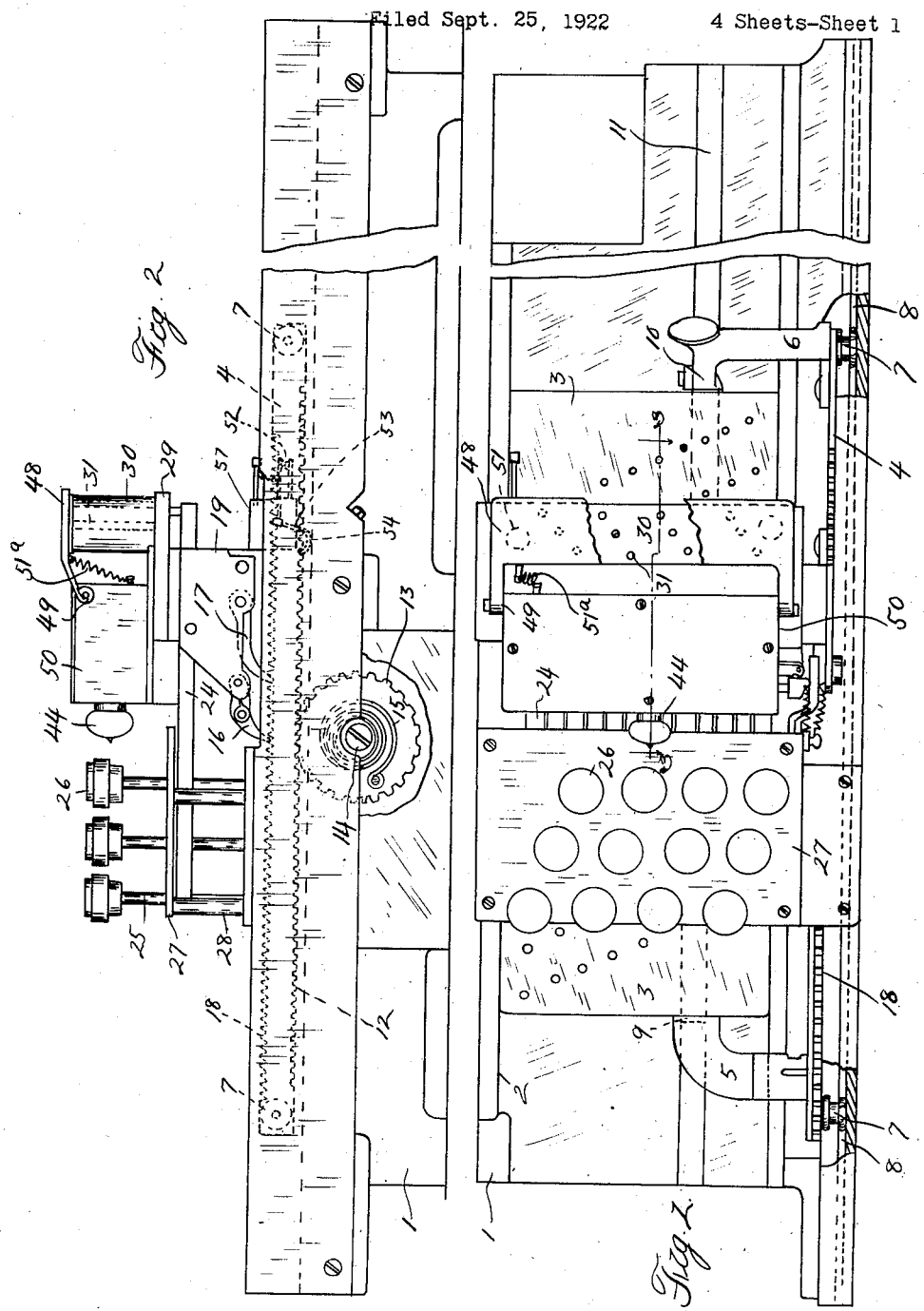
Inventor
Dewey C. Daubmeyer
By Whittemore, Hulbert, Whittemore, & Belknap
Attorneys March 30, 1926.
D. C. DAUBMEYER
1,578,717
ERROR INDICATOR FOR TABULATION CARDS
Filed Sept. 25, 1922      4 Sheets-Sheet 2
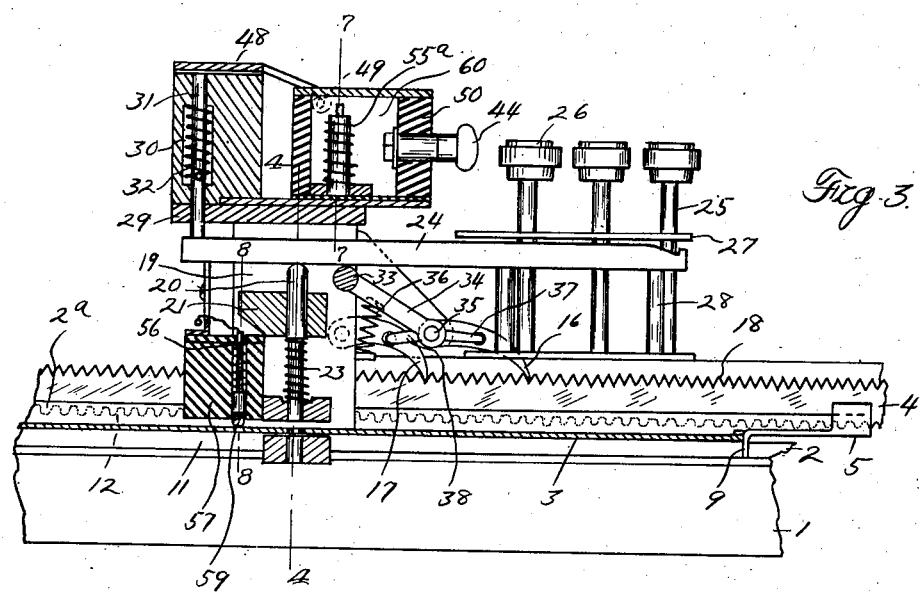
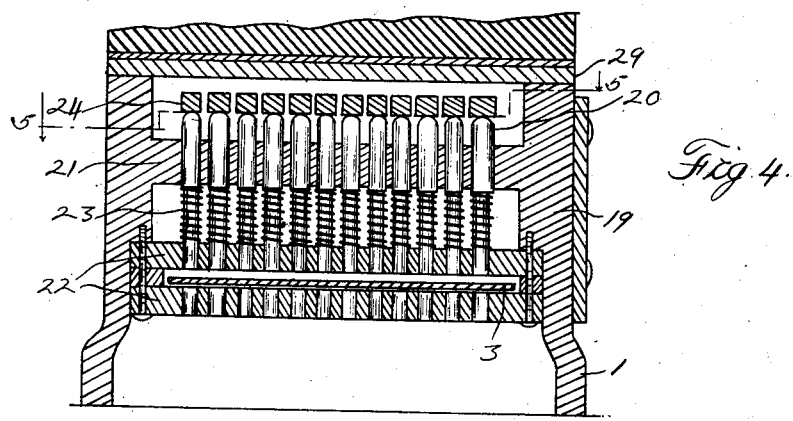
Inventor
Dewey C. Daubmeyer
By Whittemore, Hulbert, Whittemore, & Belknap
Attorneys March 30, 1926. 1,578,717
D. C. DAUBMEYER
ERROR INDICATOR FOR TABULATION CARDS
Filed Sept. 25, 1922 4 Sheets-Sheet 3
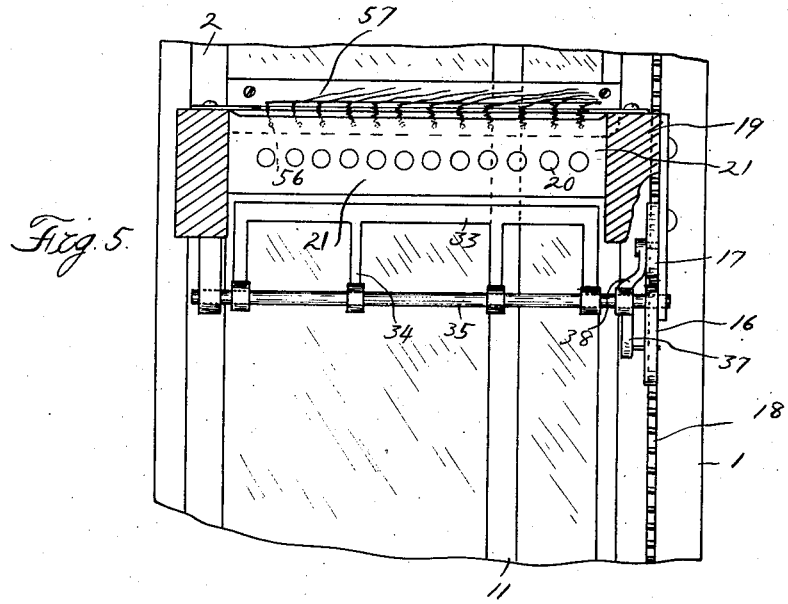
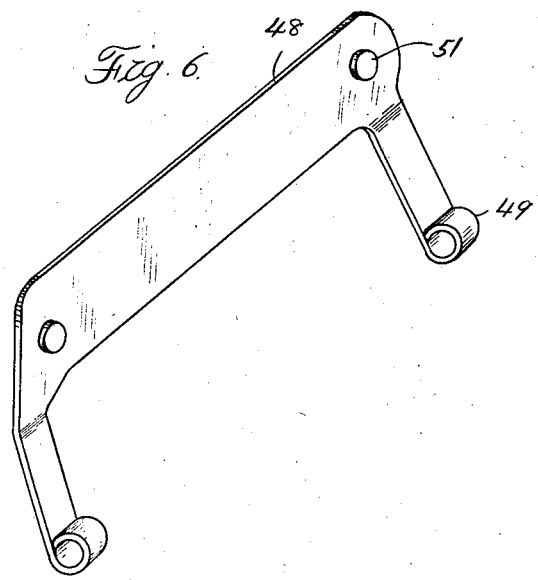
Inventor
Dewey C. Daubmeyer
By Whittemore, Hulbert, Whittemore, & Belknap
Attorneys March 30, 1926.                                                              1,578,717
D. C. DAUBMEYER
ERROR INDICATOR FOR TABULATION CARDS
Filed Sept. 25, 1922                4 Sheets-Sheet 4
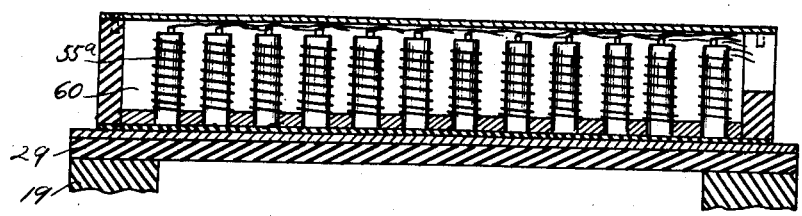
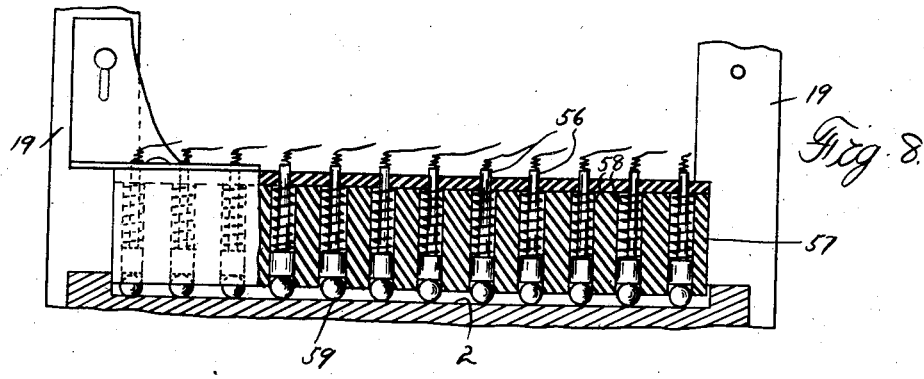
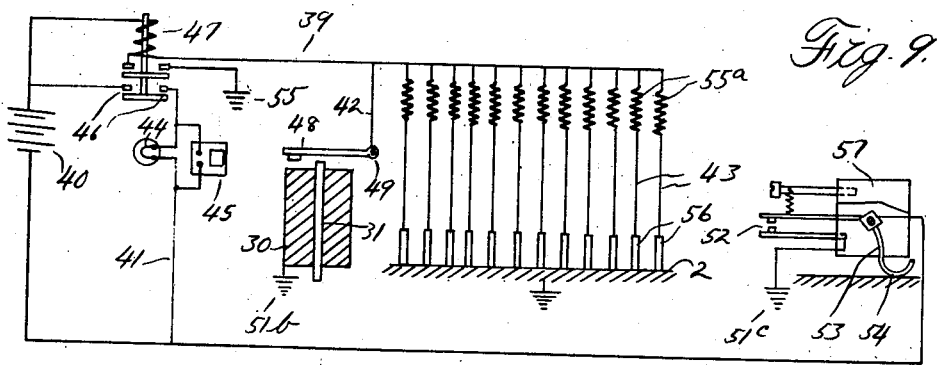
Inventor
Dewey C. Daubmeyer
By Whittemore, Hulbert, Whittemore, & Belknap
Attorneys Patented Mar. 30, 1926.

1,578,717

UNITED STATES PATENT OFFICE.

DEWEY C. DAUBMEYER, OF DETROIT, MICHIGAN.

ERROR INDICATOR FOR TABULATION CARDS.

Application filed September 25, 1922. Serial No. 590,473.

*To all whom it may concern:*

Be it known that I, DEWEY C. DAUBMEYER, a citizen of the United States of America, residing at Detroit, in the county of Wayne and State of Michigan, have invented certain new and useful Improvements in Error Indicators for Tabulation Cards, of which the following is a specification, reference being had therein to the accompanying drawings.

This invention relates to error indicators for tabulation cards and has special application to machines through which cards are adapted to be fed either for perforating the same to select certain data on said cards or for verifying the accuracy of perforations previously made. The disclosure if this application to some extent corresponds to that of applicant's companion case Serial Number 483,426, filed July 9, 1921.

It is one of the objects of the invention to provide means for indicating the erroneous provision of more than one perforation in any data column of a card, said indicating means being applicable to a machine having provision for advancing the card transversely of the columns thereof.

A further object is to provide an error indicator for use upon machines adapted to advance a perforated card which indicator will be energized when the erroneous portion of the card has been advanced to a certain point of the machine, provision being made for continuously maintaining energization of the indicator during completion of the advancement of the card through the machine.

A further feature of the invention is a provision for controlling an electric circuit by the travel of a card through a tabulating machine and automatically breaking said circuit upon removal of the card from the machine.

In the drawings:—

Figure 1 is a plan view of the improved machine;

Figure 2 is a side view of the same;

Figure 3 is a longitudinal sectional view taken on line 3—3 of Figure 1;

Figure 4 is a cross-section on line 4—4 of Figure 3;

Figure 5 is a horizontal sectional view taken on line 5—5 of Figure 4;

Figure 6 is a perspective view of a contact plate employed in controlling the circuit shown in Figure 2;

Figures 7 and 8 are cross sections on line 7—7 and 8—8 of Figure 3;

Figure 9 is a diagram of the electrical signal connections.

In these views, the reference character 1 designates the base of a tabulating machine verifier, and 2 indicates a guideway formed between ribs 2ª upon the top surface of said base. Said guideway provides for the advance longitudinally on the machine of perforated tabulation cards, one of which is indicated at 3. The card advancing carriage comprises a bar 4 longitudinally extended at one side of the base 1, and card advancing and card retracting arms 5 and 6 respectively projecting above the guideway 2 from the rear and forward ends of the bar 4. The carriage is guided by engagement of rollers 7 at each end of bar 4 with a rib 8 upstanding upon the base, and by engagement of fingers 9 and 10 respectively carried upon the outer ends of the arms 5 and 6 in a groove 11 formed longitudinally in the guideway 2. The lower edge of the bar 4 is formed with a rack of teeth 12 engaged by a gear 13 journaled upon a stub-shaft 14, and a spring 15 coiled upon said shaft exerts a rotative effort upon said gear tending to advance the carriage. 16 and 17 are escapement pawls alternately engageable with a rack of pointed teeth 18 formed upon the upper edge of the bar 4 and controlled as hereinafter explained:

Substantially midway between the ends of the machine a pair of standards 19 is mounted upon the base 1 respectively at opposite sides of the guideway 2. Between said standards a row of vertical plungers 20 is arranged above the guideway engaging upper and lower spaced guide-bars 21 and 22 rigidly extending between the standards 19. Springs 23 coiled upon said plungers intermediate said guide-bars urge the plungers upwardly maintaining their lower ends normally substantially flush with the under-face of the lower bar 22. The plungers 20 are respectively actuable by a corresponding series of key bars 24 extending longitudinally of the machine and engaging above the plungers 20 at a relatively short distance from the rear ends of said bars. The forward ends of said key bars respectively engage the vertical stems 25 of a series of keys 26 suitably numbered. The stems 25 are mounted in a pair of horizontal guide-plates 27 terminally supported by pins 28 rising from the base 1 at each side of the guideway 2.

Upon the standards 19 is surmounted a plate 29 carrying a casing 30 elongated transversely of the machine. Within said casing there is mounted a second series of vertical plungers 31, the lower ends of which respectively engage the rear ends of the key bars 24. Within said casing the plungers 31 are respectively downwardly urged by coiled springs 32 to establish a normal position in which the upper ends of said plungers 31 are flush with the top face of the casing 30. For reasons hereinafter made clear, the springs 32 are relatively stiff as compared to the springs 23.

Transversely beneath the series of key bars 24 there is extended a carriage escapement release rock bar 33 mounted by a plurality of arms 34 upon a rock shaft 35, and upwardly urged by a coiled spring 36 to maintain it just below said key bars in the normal position of the latter. Upon normal actuation of any key bar 24 the escapement release bar 33 is rocked downwardly and an arm 37 projecting rigidly forward from the rock shaft 35 is rocked upwardly to release the pawl 16 from the rack 18 while the pawl 17 is at the same time engaged with said rack bar by a rearwardly projecting arm 38 rigidly mounted upon said rock shaft. The carriage undergoes a very slight advance as the result of the described adjustment of the escapement pawls, such advance being sufficient to carry the point of the rack tooth previously engaged by the pawl 16 clear of the point of said pawl. When the depressed key is released the actuated key bar 24 is returned to its normal raised position by the corresponding spring 23, and the bar 33 and shaft 35 are also rocked back to their normal positions by the spring 36, the pawl 17 being thus withdrawn from the rack 18, as the pawl 16 engages with said rack. Since the point of the pawl 16 now clears the previously engaged tooth of the rack 18, the carriage is advanced by the spring 15 sufficiently to engage the next adjacent tooth of said rack with said pawl. No novelty is claimed for the described escapement mechanism.

In the operation of the machine as so far described, upon the actuation of any key 26 the forward end of the corresponding key bar is depressed, said bar normally pivoting upon the corresponding plunger 31 and functioning as a lever of the second class to depress the corresponding plunger 20. If the proper key has been actuated and a perforation in the card 3 is properly registered with said plunger 20, the latter will be free to descend and engage in the registered perforation of the card. Under these conditions no limitation is placed upon movement of the actuated key bar such as might prevent the release of the escapement pawls. If, however, there is an error either in striking the proper key 26, or in the location of a perforation in the card 3, the plunger 20 used with the actuated key bar 24 fails to register with a perforation in said card and the imperforate portion of the card encountered by said plunger resists depression of the latter and said plunger then becomes a fulcrum for the actuated key bar upon which the latter, functioning now as a lever of the first class, pivots to raise the corresponding plunger 31 in opposition to the restraining spring 32. Because of the shortening of the leverage occasioned by this change of fulcrum, the rock bar 33 is not depressed sufficiently to effect a release of the escapement, and the card 3 remains stationary. After actuation of any key bar 24 the same is returned to its normal horizontal position by the corresponding spring 23.

It devolves upon the operator, when the carriage fails to advance responsive to actuation of any of the keys 26, to first ascertain that the correct key was struck, and if such was the case, to remove the card to remedy the same as regards the erroneous location of the perforation. If not infrequently occurs, however, that the operator fails to observe the failure of the carriage to advance, this being particularly liable to happen under certain conditions. One of these conditions is the occurrence of an error which appears just before the card is ready to be removed from the machine, so that the operator, if working carelessly, may remove the card without observing the inaction of the carriage responsive to the final depression of a key 26. Furthermore, after failure of the operator to note inaction of the carriage, it may happen that an aperture of the card will register with the plunger 20 depressed upon the succeeding actuation of a key 26, so that the carriage will properly respond to actuation of said succeeding key or possibly to a series of keys actuated following an error thus decreasing the opportunity of the operator to note the error. It is a further defect of the machine as so far described that no indication is given to the operator of the erroneous presence of a plurality of perforations in any column of a card. When such an error is present, operation of the proper key 26 verifies the accuracy of one of the perforations but in no way discloses the presence of the superfluous perforation.

The present invention seeks to eliminate the possibilities of error above discussed by providing a signal that will be energized by failure to release the carriage escapement and which will remain energized during the entire subsequent travel of the card through the machine, thus allowing ample opportunity for the operator's attention to be attracted to the signal. Also provision is made for closing the circuit of said signal responsive to the presence of a plurality of perforations in any column of a card. Thus 39 is an electric circuit adapted to be energized by a battery 40 and having, in parallel, branches 41 and 42 and a plurality of branches 43. The branch 41 contains signal means preferably both visual and audible. Thus in the diagram a light bulb 44 and a buzzer 45 are shown connected in said branch. Said branch 41 is under control of a relay having the normally open switch 46 in said branch and having its coil connected in the main portion of the circuit 39. The branch 42 and the branches 43 are normally open and contain means to control energization of the relay coil 47. Thus 48 is a contact plate formed of brass or some other good conductor, said plate being hinged, as indicated at 49, upon an insulating block 50 at the ends of the latter. The plate 48 is arranged in a slightly spaced relation above the plungers 31 so as to be engaged by any of said plungers upon an upward shifting of the latter from normal position. Preferably the desired normal spaced relation between said plate and plungers is maintained by securing insulating disks 51 to the under face of said plate, said disks spacing the plate in its normal position above the casing 30 and a coiled spring $51^a$ urging the plate to such position. When any of the plungers 31 make contact with the plate 48 a ground connection to the frame of the machine is established, as indicated in the diagram at $51^b$, since the plungers 31 all have electrical connections with the frame of the machine through the casing 30. The other side of the circuit 41 is grounded to the frame of the machine, as indicated at $51^c$, this connection being established through a normally opened switch 52 under control of an arm 53 having a curved portion 54 bearing upon the guide-way 2. The described arrangement is such that insertion of a card 3 beneath the curved end of the arm 53 effects a rocking of said arm sufficient to close the switch 52 and establish a ground to the frame through said switch. Thus when one of the plungers 31 rises into contact with the plate 48 due either to actuation of the wrong key 26 or to the erroneous absence of a perforation in the card 3 registering with plunger 20 controlled by the actuated key the main circuit 39 is closed through the branch 42. The depression of the key effecting the initial energization of branch 42 and relay 47 may be only momentary but a prolonged energization of the relay is maintained by establishment of a ground at 55 when the relay is initially energized. Consequently the signal branch 41 is maintained closed by the relay 47, this energization continuing until the main circuit including the grounds $51^c$ and 55 is deenergized at the switch 52 by removal of the card from the machine.

As so far described, the invention provides for a prolonged energization of the signals 44 and 45 in the event of depression of the wrong key or of an error in the card involving failure to properly locate a perforation. The branches 43 are provided for the purpose of indicating the erroneous presence of two or more perforations in the same column of the card. Thus $55^a$ designates a plurality of resistance coils preferably substantially equal and respectively included in the branches 43. Said branches furthermore respectively include plungers 56 mounted in a block 57 formed preferably of insulating material and lightly bearing upon the guide-way 2 under the effort of light coil springs 58. Said plungers are adapted to yield upwardly to permit engagement of a card 3 beneath the same, the frictional resistance of the cards to such movement being minimized by employing balls 59 to transmit the thrust of the plungers to the guide-way (or card). The resistances $55^a$ are of such values as to require energization of two or more thereof to establish a sufficient flow of current through the main circuit 39 to operatively energize the relay 47. Consequently as the columns of any card 3 are individually registered with the plungers 56 if said columns are each correctly perforated at only one point, only one of the plungers 56 will establish a ground connection with the frame of the machine. If, however, the registering column is erroneously perforated at two or more points a plurality of the branches 43 will be energized, producing a current flow adequate to operatively energize the relay 47. The latter will then effect closing of the signal branch 41, hereinbefore described, and will maintain energization of said branch until the erroneous card has been removed from the machine. Removal of the card permits the switch 52 to open and thus breaks the circuit including ground connections 55, $51^c$ through which initial energization of the relay coil has been prolonged, as has been described. It is preferred to form the insulating block 50 with a chamber 60 within which the resistances $55^a$ are disposed as is best seen in Figure 7, and said block may furthermore be utilized as a mounting for the signal light 44.

While the described signal means has been disclosed in its application to a tabulating machine of the verifier type it is evident that the invention is applicable to other tabulating machines and particularly such machines as are commonly employed for punching the perforations in tabulation cards.

What I claim as my invention is:—

1. In an error indicator, the combination with means for rectilinearly advancing a perforated sheet, and control devices adapted to yieldably bear upon said sheet and proportioned to enter the perforations of the sheet, and a signal device responsive to said control devices only through simultaneous energization of a plurality thereof.

2. In an error indicator, the combination with means for effecting a step by step rectilinear advancement of a perforated sheet, the perforations thereof being spaced in the direction of advancement a distance equal to the unit of advancement, a signal device, and a plurality of control devices therefor adapted to yieldably bear upon said sheet and proportioned to enter registering perforations of the sheet and means coacting therewith to exercise control of said signal.

3. In an error indicator a plurality of keys, means actuable selectively by said keys for effecting the step by step advancement of a perforated sheet, a row of control devices extending transversely to the direction of travel of the sheet and mounted to bear yieldably upon the sheet and proportioned to enter registering perforations of the sheet to exercise control, a signal device, and means whereby said signal is responsive to said control devices only through simultaneous energization of a plurality thereof.

4. In an error indicator, the combination with means for rectilinearly advancing a perforated sheet, of a fixed contact arranged at one side of the path of the sheet and movable contacts at the other side of said path mounted to yieldably bear upon the sheet and proportioned to project through registering perforations of the sheet to engage the fixed contact, circuits controlled by said movable contacts, and an electric signal adapted for energization only through a plurality of said circuits.

5. In an error indicator, the combination with means for rectilinearly advancing a perforated sheet, of an electric signal device, a control circuit for said device having branches in parallel, a contact in said circuit at one side of the path of travel of said sheet, and a plurality of contacts connected in said branches and mounted to yieldably bear upon said sheet at the other side thereof, and proportioned to project through the perforations of said sheet upon registration therewith to engage said fixed contact.

6. In an error indicator, means for rectilinearly advancing a perforated sheet, an electric signal device, a circuit for said device having parallel branches, substantially equal resistances respectively connected in said branches, a contact member connected in said circuit at one side of the path of travel of said sheet, and a row of contact members extending transversely to the travel of the sheet and adapted to yieldably bear upon the sheet in opposed relation to said fixed contact, said yieldable members being respectively included in said branches and being proportioned to project through the perforations of the sheet upon registration therewith to close said circuit by engagement with the fixed contact member.

7. In an error indicator, the combination with means for rectilinearly advancing a sheet having data columns extending transversely to its direction of travel and having perforations at selective points in said columns, of a signal device, and means for energizing said device responsive to the presence of more than one perforation in the same column of said sheet.

8. In an error indicator, the combination with means for rectilinearly advancing a perforated sheet, of a signal energized responsive to an error as regards the perforations of said sheet, and means for prolonging energization of said signal until the sheet has been removed from the machine.

9. In an error indicator, the combination with means for rectilinearly advancing a perforated sheet, of an electric signal adapted to be energized through the presence of an error as regards location of the perforations in said sheet, a circuit for said signal and automatic means for breaking said circuit upon removal of the sheet from the machine.

10. In an error indicator, the combination with means for rectilinearly advancing a perforated sheet, of a signal, a relay controlling said signal, means for breaking the signal circuit automatically through removal of the sheet from the machine, and means for energizing the relay circuit through the erroneous location of a perforation in said sheet.

11. In an error indicator, the combination with means for rectilinearly advancing a perforated sheet, of an electric circuit, a contact in said circuit at one side of the path of said sheet, a plurality of branches in said circuit, and contacts respectively included in said branches and adapted to bear upon the other side of said sheet respectively in the paths of advancement of the perforations of the card, said contacts having rolling engagement with said sheet.

12. In an error indicator, the combination with means for advancing a perforated sheet, of a circuit controlled by said sheet, a contact in said circuit arranged at one side of said sheet, and a plurality of branches connected in said circuit, and contacts controlling said branches arranged to bear upon said sheet at the opposite side thereof from the first mentioned contact, and means yieldably urging said branch controlling contacts toward said first mentioned contact.

13. In an error indicator, means for advancing a perforated sheet and electric signal device, a control circuit for said device having parallel branches of substantially equal resistance, a contact and normally opened switches controlling said branches having control elements registering respectively with the paths of travel of the perforations of said card and adapted to close said branches through entry in registering the perforations.

14. In an error indicator, the combination with means for advancing a perforated sheet, of a circuit including an electric signal, means for initially energizing said circuit through the presence of an error as regards location of a perforation in said sheet, a relay for prolonging energization of the signal circuit, a switch controlling energization of the relay, and a control element for said switch engageable by said sheet to affect closing of the switch during a predetermined travel of the sheet.

In testimony whereof I affix my signature.

DEWEY C. DAUBMEYER.